United States Patent [19] [11] Patent Number: 4,736,714
Hokazono et al. [45] Date of Patent: Apr. 12, 1988

[54] ENGINE INTAKE SYSTEM

[75] Inventors: Kazuaki Hokazono; Tetsuo Hiraoka; Koichi Hatamura, all of Hiroshima, Japan

[73] Assignee: Mazda Motor Corporation, Hiroshima, Japan

[21] Appl. No.: 898,040

[22] Filed: Aug. 19, 1986

[30] Foreign Application Priority Data

Aug. 20, 1985 [JP] Japan .................................. 60-183531
Aug. 20, 1985 [JP] Japan .................................. 60-183530
Jul. 9, 1986 [JP] Japan ........................... 61-105453[U]

[51] Int. Cl.⁴ .......................................... F02B 75/18
[52] U.S. Cl. ............................. 123/52 M; 123/52 MC
[58] Field of Search ......... 123/52 M, 52 MV, 52 MB, 123/52 MC

[56] References Cited

U.S. PATENT DOCUMENTS 3,441,008  4/1969  Nelson .......................... 123/52 MB

FOREIGN PATENT DOCUMENTS 115818   9/1981  Japan .
148025   9/1982  Japan .
175121  11/1983  Japan .
0169627  9/1985  Japan .............................. 123/198 E
2117043 10/1983  United Kingdom .......... 123/52 MB
0626238  8/1978  U.S.S.R. ........................ 123/52 MV Primary Examiner—Charles J. Myhre
Assistant Examiner—David A. Okonsky
Attorney, Agent, or Firm—Fleit, Jacobson, Cohn & Price

[57] ABSTRACT

This invention relates to an internal combustion engine including a plurality of groups of combustion chambers and at least a first expansion chamber and a second expansion chamber. The first and second expansion chambers extend in a lengthwise direction and are separated from each other by a partition wall. The first expansion chamber is connected with one group of combustion chambers through separate branch passages. The second expansion chamber is also connected with another group of combustion chambers respectively through separate branch passages. First and second intake passages are connected at downstream ends with the first expansion chamber and the second expansion chamber, respectively. An auxiliary communicating passage is provided along the partition wall independent from said first and second intake passages and connects the first and second expansion chambers with each other. A length changing device for alternately communicating the first and second expansion chambers with each other by an auxiliary communicating passage of a minimum length and by an auxiliary communicating passage of a maximum length in accordance with engine operating condition is provided. The first and second intake passages have lengths a sum of which is greater than the maximum length of the auxiliary communicating passage.

19 Claims, 4 Drawing Sheets

ENGINE INTAKE SYSTEM

BACKGROUND OF THE INVENTION

1. Field of the Invention

The present invention relates to an engine intake system and more particularly to an intake system for a multiple cylinder engine. More specifically, the present invention pertains to an engine intake system which utilizes an intake inertia effect and an intake resonance between engine cylinders.

2. Description of the Prior Art

Conventionally, it has been known to obtain an increased intake gas charge through utilizations of the intake inertia and the intake resonance effects. By the term utilization of "inertia effect", it is meant that the pressure wave produced in an intake passage during cyclical operations of the intake valve is effectively utilized to increase the intake gas charge by for example determining the valve timing so that a positive pressure arrives at the intake port at a final period of the intake stroke. In contrast to the inertia effect, the resonance effect is a phenomenon inherent to a multiple cylinder engine. In an engine wherein the resonance effect is utilized, the engine cylinders are divided into groups, each group consisting of cylinders which are not adjacent to each other in terms of the order of ignition, and the intake ports of the cylinders in the same group are communicated together through an intake passage so that the pressure waves produced at the intake ports are resonated in the intake passage. Thus, the pressure in the intake passage is significantly amplified and a supercharging effect is obtained. In order to obtain an increased supercharging effect, it is therefore necessary to have the natural frequency of the intake gas in the intake system appropriately matched with the frequency of the operation of the intake valve.

In an engine intake system wherein the cylinders are divided into a plurality of groups as described above, it is required for obtaining a satisfactory resonance effect to open the intake passages for the respective cylinder groups separately to the atmosphere because otherwise the intake pressure in one passage will interfere with the intake pressure in the other passage significantly weakening the pressure in the intake passages. In a conventional arrangement, the intake passage for one group is connected at the upstream end with the upstream end of the intake passage for the other group so that the pressures in the both passages are equilibrated at the upstream ends to thereby obtain an effect of opening the passages separately to the atmosphere.

It should however be noted that in the intake system wherein the upper ends of the intake passages for the respective cylinder groups are connected together as mentioned above, pressure transmittal in the intake passages for the same cylinder group is to some extent disturbed so that the pressure resonance effect is adversely decreased.

In Japanese utility model application No. 57-71445 filed on May 18, 1982 and published for public inspection on Nov. 22, 1983 under the disclosure No. 58-175121, there is disclosed an engine intake system including expansion chambers which are separated by a partition wall, each of the expansion chambers being connected with individual combustion chambers which are not adjacent to each other in terms of order of combustion through independent branch passages. The expansion chambers are respectively connected with resonance passages which are communicated with each other at the upstream ends. There is also provided an auxiliary resonance passage which has a length and a diameter substantially equal to those of the first mentioned resonance passages. In the proposed intake system, the pressure wave transmittal is still partly made through the main resonance passages through which the intake air flows. Therefore, the pressure wave transmittal is still to some extent disturbed and the resonance effect is decreased.

It is known that the natural frequency of the intake system is dependent on the length of the intake passage and the volume of the expansion chamber. Contrary to this, the frequency of the intake valve operation is determined by the engine speed. It will therefore be understood that it is required to change the length of the intake passage and the volume of the expansion chamber in accordance with the engine speed in order to obtain an effective supercharging function under the intake pressure resonance irrespective of the engine speed. In this view, Japanese patent application No. 56-33990 filed on Mar. 11, 1981 and published for public inspection on Sept. 13, 1982 under the disclosure No. 57-148025 proposes an intake system having an expansion chamber for each cylinder group and an intake passage extending from the expansion chamber toward upstream side, a passage length changing arrangement being provided in the vicinity of the junction between the intake passages for the respective cylinder groups. It should however be noted that the arrangement is disadvantageous in that a satisfactory resonance effect cannot be obtained since the passage for the intake air flow is used in common for the pressure wave transmittal.

SUMMARY OF THE INVENTION

It is therefore an object of the present invention to provide an engine intake system in which a satisfactory resonance effect can be obtained.

Another object of the present invention is to provide an engine intake system in which the pressure resonance passage is provided separately from the intake passage for introducing the intake air flow.

A further object of the present invention is to provide an engine intake system in which an adjustable pressure resonance passage is provided without increasing the space of the intake system.

According to the present invention, the above and other objects can be accomplished by an internal combustion engine including a plurality groups of combustion chambers, the combustion chambers in each group being not adjacent to each other in terms of order of combustion, expansion chamber means having at least a first expansion chamber and a second expansion chamber which are separated from each other, said first expansion chamber being connected with oone group of combustion chambers respectively through separate branch passages, said second expansion chamber being connected with the other group of combustion chambers respectively through separate branch passages, first intake passage means connected at a downstream end with said first expansion chamber, second intake passage means connected at a downstream end with said second expansion chamber, said first and second intake passage means having upstream ends communicated together by a communicating section, the improvement comprising auxiliary communicating passage means independent from said first and second intake passage means and connecting said first and second expansion chambers with each other, communicating passage length changing means for changing length of the auxiliary communicating passage means between a minimum length and a maximum length in accordance with engine operating condition, said first and second intake passage means having lengths of which sum is greater than said maximum length of the auxiliary communicating passage means.

According to the features of the present invention, the pressure transmittal for the pressure resonance is made substantially through the auxiliary communicating passage means so that the pressure resonance is not adversely affected by the intake air flow. Therefore, it is possible to obtain an effective pressure resonance.

According to a further preferable aspect, the present invention is embodied in the form of a V-type multiple cylinder engine including a plurality of cylinders which are arranged in two rows forming a V-shape, intake passage means for passing intake air to said cylinders, said intake passage means including expansion chamber means located between said rows of the cylinders and having a first expansion chamber and a second expansion chamber which are separated by a partition wall extending substantially in parallel with the rows of the cylinders, first individual branch passages connecting said first expansion chamber respectively with the cylinders in one of the rows, second individual branch passages connecting said second expansion chamber respectively with the cylinders in the other row, a first intake passage connected at a downstream end with said first expansion chamber, a second intake passage connected at a downstream end with said second expansion chamber, said first and second intake passages being connected together at upstream ends, communicating passage means provided in said partition wall and having one end opened to said first expansion chamber and the other end opened to said second expansion chamber.

The above and other objects and features of the present invention will become apparent from the following description of preferred embodiments taking reference to the accompanying drawings.

DESCRIPTION OF THE PREFERRED EMBODIMENTS

Figure 1:
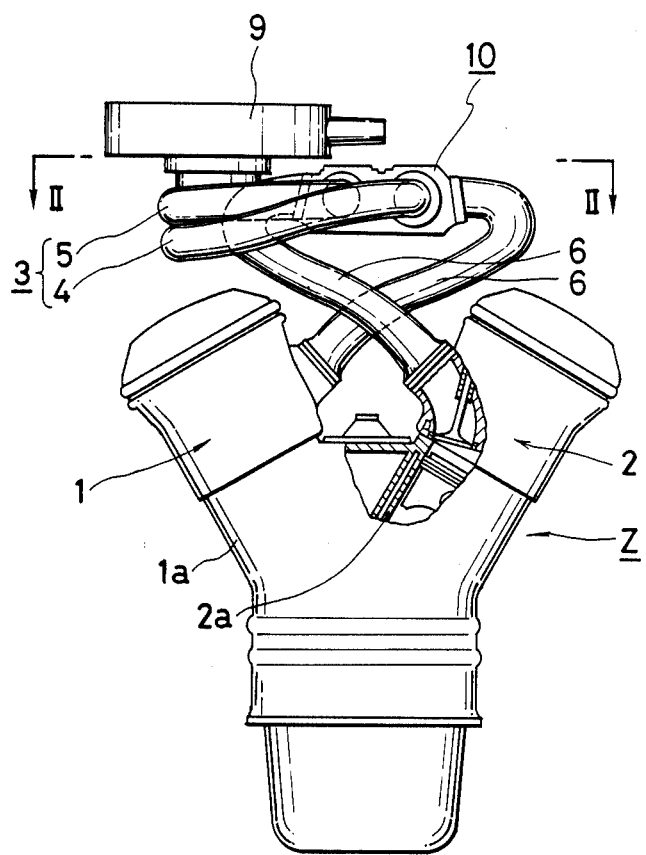
FIG. 1 is a partly sectioned front view of a V-type engine having an intake system in accordance with one embodiment of the present invention.
Figure 2:
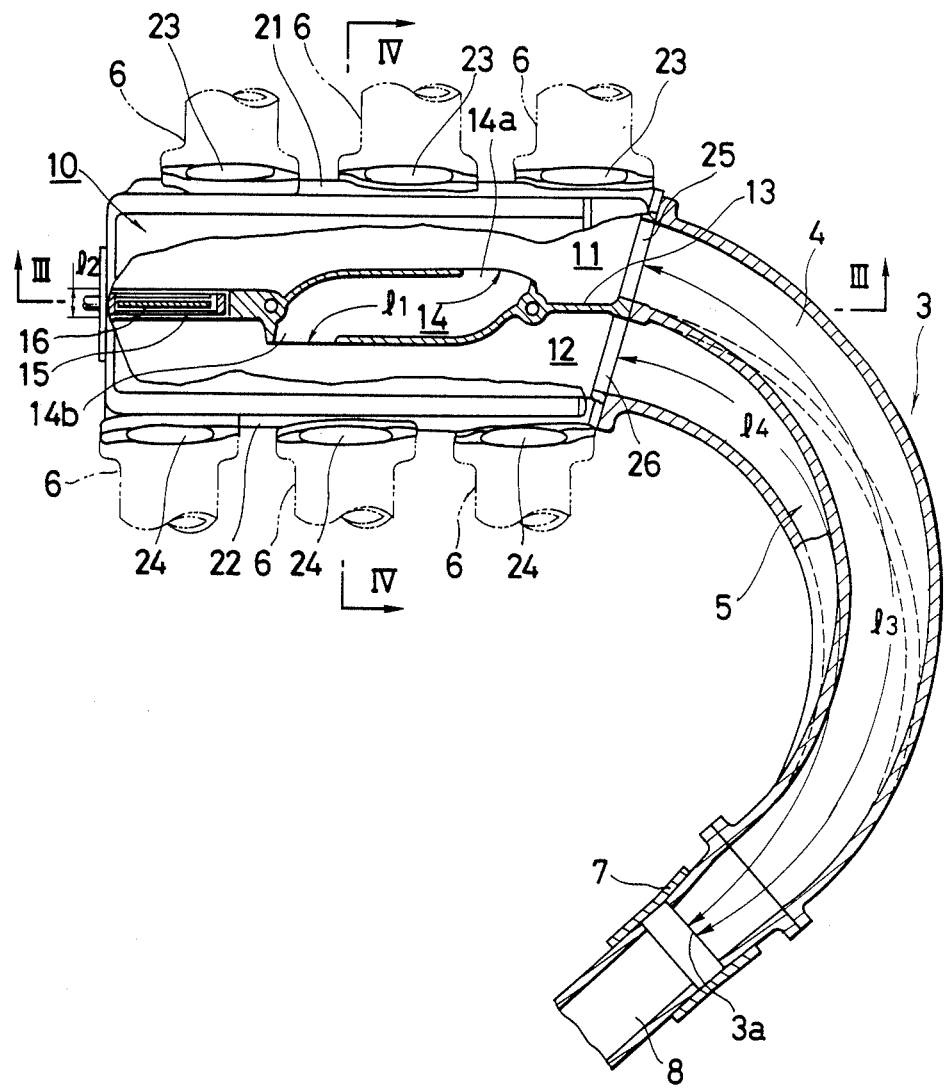
FIG. 2 is a sectional view taken substantially along the line II—II in FIG. 1.
Figure 3:
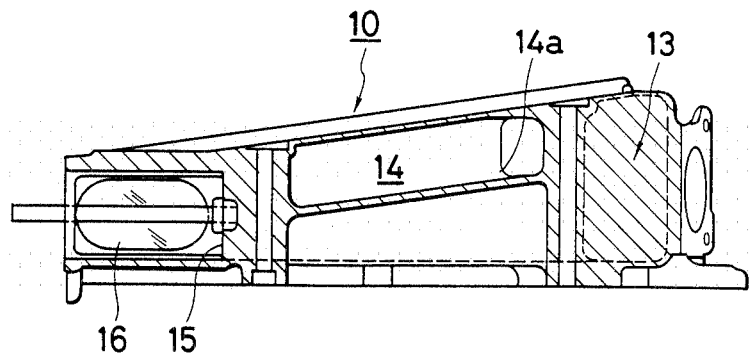
FIG. 3 is a sectional view taken substantially along the line III—III in FIG. 1.
Figure 4:
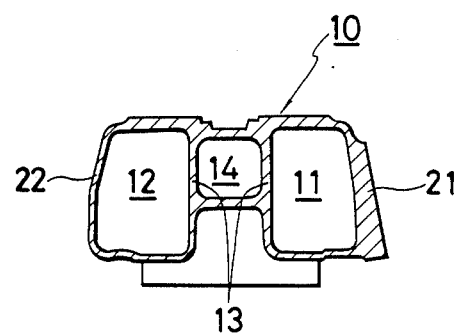
FIG. 4 is a sectional view taken substantially along the line IV—IV in FIG. 2; and, FIG. 5 is a sectional view similar to FIG. 2 but showing another embodiment.

Referring to the drawings particularly to FIG. 1, there is shown a V-type, six cylinder vehicle engine Z having a first cylinder row 1 and a second cylinder row 2 which are arranged to form a V-shape. The first cylinder row 1 includes cylinders 1a which are not adjacent to each other in terms of order of combustion. Similarly, the second cylinder row 2 includes cylinders 2a which are not adjacent to each other in terms of order of combustion. Above the space between the cylinder rows 1 and 2, there is provided an expansion chamber case 10 which is of a rectangular shape and arranged with its lengthwise direction in parallel with the direction of the cylinder rows. The expansion chamber case 10 is divided by a partition wall 13 extending substantially in the lengthwise direction of the case into a first expansion chamber 11 and a second expansion chamber 12 as shown in FIGS. 2 through 4. The first expansion chamber 11 is connected through connecting ports 23 formed in a side wall 21 of the case 10 with individual branch passages 6 which are in turn connected with the cylinders 1a in the first row 1. The second expansion chamber 12 is connected through connecting ports 24 formed in another side wall 22 of the case 10 with individual branch passages 6 which are in turn connected with the cylinders 2a in the second cylinder row 2. The first expansion chamber 11 has a connecting port 25 formed in an end wall of the case 10. The connecting port 25 is connected with a first intake passage 4 as described in detail later. The second expansion chamber 12 has a connecting port 26 which is formed in the end wall of the case 10 and connected with a second intake passage 5.

The partition wall 13 is formed at a longitudinally intermediate portion with a first communicating passage 14 which is of a substantially rectangular sectional configuration and extends substantially longitudinally of the partition wall 13. The passage 14 is opened at one end 14a to the first chamber 11 and at the other end to the second chamber 12. The partition wall 13 is further formed at a portion opposite to the connecting ports 25 and 26 with respect to the communicating passage 14 with a second communicating passage 15. A shut-off valve 16 of a butterfly type is provided in the second communicating passage 15 so that the passage can be opened depending on the engine operating condition.

The first intake passage 4 and the second intake passage 5 connected respectively with the connecting ports 25 and 26 are connected at the upstream ends with a connecting pipe 7 which is in turn connected with a common intake pipe 8. It will therefore be understood that the first and second communicating passages are connected together at the upstream ends by the connecting pipe. The common intake pipe 8 is connected at the upstream end with an air cleaner 9.

The first communicating passage 14 has an effective length $l_1$ whereas the second communicating passage has an effective length $l_2$ which is smaller than the effective length $l_1$. The communicating passage 14 is operationally effective when the communicating passage 15 is closed by the shut-off valve 16 but becomes ineffective when the communicating passage 15 is opened. Further, the intake passages 4 and 5 have passage lengths $l_3$ and $l_4$, respectively, and the sum of the lengths $l_3$ and $l_4$ is greater than the length $l_1$ of the first communicating passage 14.

In operation, when the engine Z is started, the intake air is drawn through the intake passages 4 and 5 respectively into the first expansion chamber 11 and the second expansion chamber 12, and then through the individual branch passages 6 into the individual cylinders 1a and 2a. In the illustrated arrangement, a high level of supercharging effect can be accomplished utilizing the inertia effect and the resonance effect. Describing more specifically, it should be noted that in the first intake system constituted by the first expansion chamber 11 and the first intake passage 4, the cylinders 1a are not adjacent to each other in terms of the order of combustion, so that the pressure waves produced in the respective cylinders 1a resonate producing pressure wave of increased amplitude, the frequency of the pressure wave being determined depending on the volume of the expansion chamber 11 and the length of the resonating passage. Similarly, in the second intake system constituted by the second expansion chamber 12 and the second intake passage 5, a strong pressure wave is produced.

In order that the intake air inertia effect be effectively utilized while creating the resonated pressure waves of a desired frequency, it is necessary to avoid mutual influence of the pressures in the first and second intake system. According to the structure described above, the desired result can be obtained by providing the communicating passages 14 and 15 in the partition wall 13. Since the first expansion chamber 11 and the second expansion chamber 12 are communicated alternatively through the first communicating passage 14 or the second communicating passage 15, there is produced an effect of the passages for the cylinders in the first and second rows being opened to the atmosphere at the point of the communication so that there will no longer be intake air flow between the passages for the cylinders in one row and the passages for the cylinders in the other row. Therefore, there will be produced pressure waves having a frequency inherent to the respective intake systems.

The first and second communicating passages 14 and 15 function only as the passages for transmitting pressure waves and the intake passages 4 and 5 upstream the expansion chambers 11 and 12 function to pass the intake air flow. Thus, as compared with an arrangement wherein the passages for the cylinders in the respective rows are communicated only at the upstream ends of the intake passages 4 and 5, the pressure transmittal can be made very effectively. It is therefore possible to obtain a higher level of resonance. The relationship in the passage lengths which are determined as described previously ensures that the interference between the pressure waves in the passages for the cylinders in the respective rows occurs always in any one of the communicating passages 14 and 15.

In the illustrated structure, the shut-off valve 16 is controlled so that it is opened under a high speed engine operation and closed under a low speed engine operation. With this control, pressure waves of higher frequency are produced under a high engine speed and those of lower frequency are produced under a low engine speed. Thus, it is possible to have the frequency of the pressure waves matched more appropriately to the operating cycle of the engine intake valve. It is therefore possible to obtain a high level resonance effect substantially throughout the engine operating range.

Figure 5:
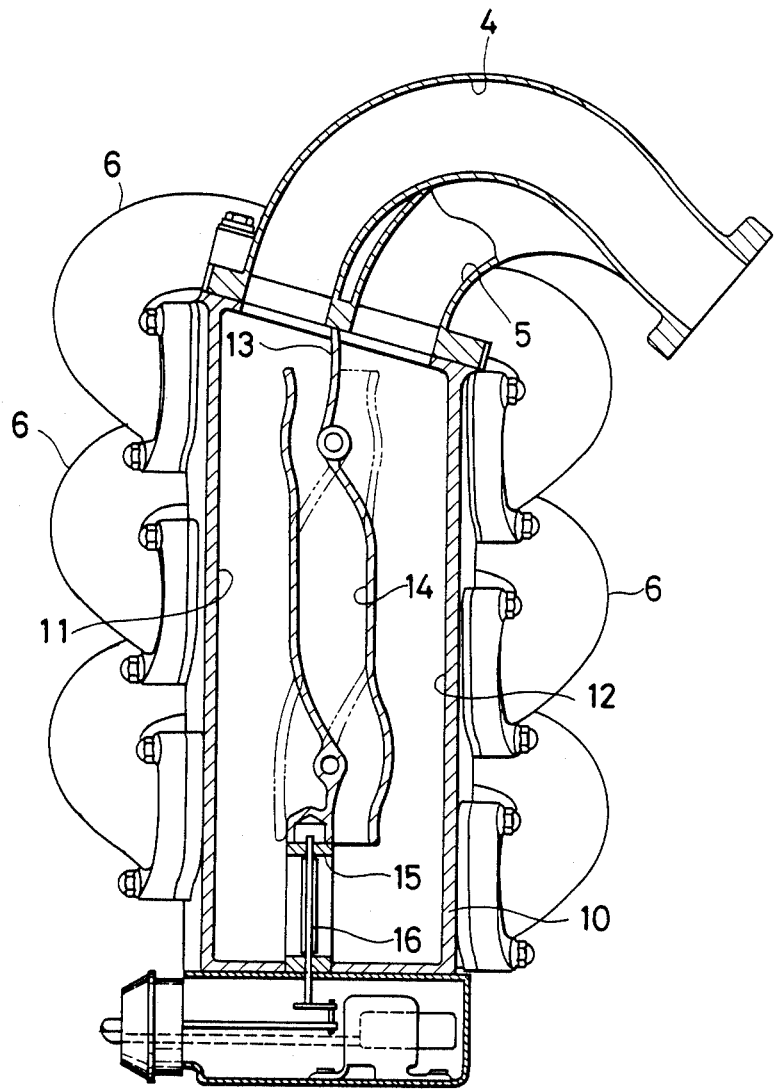

Referring now to FIG. 5, the embodiment shown therein has a first communicating passage 14 formed substantially throughout the length of the partition wall 13. It will further be noted that the first intake passage 4 and the second intake passage 5 are curved substantially in a plane passing through the case 10. The first intake passage 4 passes outside the curvature of the second intake passage 5 so that the first intake passage 4 has a larger radius of curvature than the second intake passage 5. In this arrangement of the intake passages 4 and 5, there will be a tendency that the intake air is concentrated in the first intake passage 4 which is outside the curvature of the second intake passage 5. In order to avoid possible unbalance of the intake air distribution among the cylinder rows 1 and 2, the first communicating passage 14 is formed so that the opening to the first expansion chamber 11 is directed toward the upstream side so that a part of the intake air flowing through the first intake passage 4 is passed into the second expansion chamber 12. Thus, it is possible to eliminate the possibility of uneven distribution of the intake air among the cylinder rows 1 and 2.

It should further be noted that in a V-type engine, the individual passages 6 for the first cylinder row 1 are offset from the passages for the second cylinder row 2 in the direction of the length of the case 10. With this arrangement, the endwise passage 6 for the second cylinder row 2 is located close to the end of the case 10 adjacent to the shutoff valve 16. In the illustrated arrangement, the shut-off valve 16 is sidewardly offset toward the expansion chamber 11 so that it is possible to secure a space in the vicinity of the endwise passage 6 for the second cylinder row 2. This arrangement of the shut-off valve 16 is also effective to ensure a satisfactory intake air supply to the endwise passage 6 for the second cylinder row 2.

The invention has thus been shown and described with reference to specific embodiments, however, it should be noted that the invention is in no way limited to the details of the illustrated structures but changes and modifications may be made without departing from the scope of the appended claims.

We claim:

1. An internal combustion engine including a plurality of groups of combustion chambers, the combustion chambers in each group being not adjacent to each other in terms of order of combustion, expansion chamber means having at least a first expansion chamber and a second expansion chamber, said first and second expansion chambers extending in a lengthwise direction and separated from each other by partition wall means extending in said lengthwise direction, said first expansion chamber being connected with one group of combustion chambers respectively through separate branch passages, said second expansion chamber being connected with the other group of combustion chambers respectively through separate branch passages, first intake passage means connected at a downstream end with said first expansion chamber, second intake passage means connected at a downstream end with said second expansion chamber, said first and second intake passage means having upstream ends communicated together by a communicating section, the improvement comprising auxiliary communicating passage means provided along said partition wall means independent from said first and second intake passage means and connecting said first and second expansion chambers with each other, communicating passage length changing means for continuously communicating said first and second expansion chambers with each other by one of an auxiliary communicating passage means of a minimum length and an auxiliary communicating passage means of a maximum length in accordance with engine operating condition, said first and second intake passage means having lengths a sum of which is greater than said maximum length of the auxiliary communicating passage means.

2. An engine in accordance with claim 1 in which said auxiliary communicating passage means includes a first communicating passage and a second communicating passage shorter than said first communicating passage, said passage length changing means includes shut-off valve means provided in said second communicating passage.

3. An engine in accordance with claim 2 in which said expansion chamber means includes partition wall means for separating said first and second expansion chamber means, said first passage being formed in said partition wall means to extend along said partition wall means and opened at one end to said first expansion chamber and at the other end to the second expansion chamber.

4. An engine in accordance with claim 3 in which said second passage is formed in said partition wall means to penetrate the partition wall means.

5. An engine in accordance with claim 5 in which said auxiliary communicating passage means and said passage length changing means are provided in said expansion chamber means.

6. An engine in accordance with claim 2 in which said cylinders of one group are arranged in a row and the cylinders of the other group are arranged in another row, the two rows being arranged in a V-shape with a V-shaped space therebetween, said expansion chamber means being located above the V-shaped space, said first and second expansion chambers being formed by partition wall means extending in a lengthwise direction of the partition wall means.

7. An engine in accordance with claim 6 in which said auxiliary communicating passage means includes a first communicating passage and a second communicating passage shorter than said first communicating passage, said passage length changing means includes shut-off valve means provided in said second communicating passage.

8. An engine in accordance with claim 7 in which said first communicating passage means is formed in said partition wall means to extend in a direction of the row of the cylinders and opened at one end to the first expansion chamber and at the other end to the second expansion chamber.

9. An engine in accordance with claim 8 in which said first and second intake passage means are connected with said expansion chamber means at an end of said expansion chamber means and curved toward upstream side, said first intake passage means being outside the curvature of the second intake passage means in a plane passing through said expansion chamber means.

10. An engine in accordance with claim 8 in which said second communicating passage means is formed in said partition wall means at a position adjacent to an end of the partition wall means than said other end of the first communicating passage means, said second communicating passage means is formed through said partition wall means, said shut-off valve means being of a batterfly type.

11. An engine in accordance with claim 10 in which said shut-off valve means is offset toward said first expansion chamber means.

12. An engine in accordance with claim 11 in which said individual branch passages for one row of cylinders are offset with respect to the individual branch passages for the other row of cylinders in the direction of the rows of cylinders, said shut-off valve means being located adjacent to an end of the expansion chamber means.

13. A V-type multiple cylinder engine including a plurality of cylinders which are arranged in two rows forming a V-shape, intake passage means for passing intake air to said cylinders, said intake passage means including expansion chamber means located between said rows of the cylinders and having a first expansion chamber and a second expansion chamber which have lengths extending substantially in parallel with the rows of the cylinders and are separated by a partition wall extending along the lengths of the first and second expansion chambers, first individual branch passages connecting said first expansion chamber respectively with the cylinders in one of the rows, second individual branch passages connecting said second expansion chamber respectively with the cylinders in the other row, a first intake passage connected at a downstream end with said first expansion chamber, a second intake passage connected at a downstream end with said second expansion chamber, said first and second intake passages being connected together at upstream ends, communicating passage means provided in said partition wall and opening to said first expansion chamber and to said second expansion chamber, communicating passage length changing means for continuously communicating said first and second expansion chambers with each other by one of a communicating passage means of a minimum length and a communicating passage means of a maximum length in accordance with engine operating condition.

14. An engine in accordance with claim 13 in which said first and second intake passages are connected with said expansion chamber means at an end of said expansion chamber means and curved toward upstream side, said first intake passage being outside the curvature of the second intake passage in a plane passing through said expansion chamber means.

15. An engine in accordance with claim 14 in which said communicating passage means is located at an end of said expansion chamber means.

16. An engine in accordance with claim 13 which includes second communicating passage means formed through said partition wall and provided with shut-off valve means.

17. An engine in accordance with claim 13 in which said first and second intake passages have lengths of which sum is greater than the length of the communicating passage means.

18. An engine in accordance with claim 1 in which said first and second expansion chambers and said auxiliary communication passage means are arranged in a plan view such that said auxiliary communication passage means is interposed between said first and second expansion chambers with partition walls separating said first and second expansion chambers respectively from said auxiliary communication passage means.

19. An engine in accordance with claim 18 in which said partition walls extend in parallel with each other and are continuous at upper ends with upper walls of the first and second expansion chambers.

* * * * *